United States Patent [19]

Donnelly et al.

[11] 3,948,830

[45] Apr. 6, 1976

[54] POZZOLANIC MATERIAL-BASED COATING AND STRUCTURAL COMPOSITION AND METHOD FOR FORMING

[75] Inventors: James H. Donnelly, San Francisco; William D. McGuigan, Los Altos Hills, both of Calif.

[73] Assignee: James H. Donnelly, San Francisco, Calif. ; a part interest

[22] Filed: Oct. 9, 1973

[21] Appl. No.: 404,743

[52] U.S. Cl. ................ 260/18 PN; 106/78; 260/6; 260/9; 260/13; 260/18 S; 260/29.1 SB; 260/29.2 EP; 260/37 EP

[51] Int. Cl.² .......................................... C08L 91/00

[58] Field of Search ............ 260/18 PN, 29.2 EP, 6, 260/9, 13, 37 EP, 18 S, 29.1 SB; 106/78

[56] References Cited
UNITED STATES PATENTS

| | | | |
|---|---|---|---|
| 3,198,758 | 8/1965 | Donnelly | 260/6 |
| 3,310,511 | 3/1967 | Reinert | 260/29.2 |
| 3,477,979 | 11/1969 | Hillyer | 260/29.2 |
| 3,798,191 | 3/1974 | Donnelly | 260/29.2 |

*Primary Examiner*—Eugene C. Pzucidlo
*Attorney, Agent, or Firm*—Flehr, Hohbach, Test, Albritton & Herbert

[57] ABSTRACT

A pozzolanic material-based coating and structural composition and method for forming into various forms. The components include: (a) water, (b) lime, (c) a majority of pozzolanic material, (d) a crosslinking agent (e.g. a fatty polyamide), and (e) an epoxy resin. When mixed with water the composition sets and hardens to form coatings and structures with good strength, adhesion, and flexibility. An optional fluidizing agent may be added to reduce the water requirements. The properties of the material may be varied by the addition of conventional fillers.

8 Claims, No Drawings

POZZOLANIC MATERIAL-BASED COATING AND STRUCTURAL COMPOSITION AND METHOD FOR FORMING

BACKGROUND OF THE INVENTION

This invention relates to improved stabilized pozzolanic material compositions and methods for forming same. It is known that both calcium and magnesium limes in water can be added to various soils of high pozzolanic material content to stabilize it. For example, soils treated with quantities of lime (i.e. 3 to 4 per cent by weight) are frequently used as a base for highways and other construction.

There are a number of serious drawbacks to the use of such stabilized pozzolanic material compositions. When used as structural materials, they have relatively low structural strength (e.g. on the order of 100–500 p.s.i. maximum). They cannot be formed into a film of sufficient adhesive characteristics to firmly adhere in a thin layer onto a surface such as a wall or ceiling. Further, they decompose upon prolonged exposure to water and mild acid. In addition surfaces of the material yield a dust when rubbed. Also, when sufficient water is added to make the material workable for forming the desired shape, the material tends to form cracks upon drying.

SUMMARY OF THE INVENTION AND OBJECTS

The present invention relates to a pozzolanic material-based structural and coating composition and a method for forming the same. The composition comprises an intimate mixture in a gel-like internal configuration of (a) pozzolanic material, (b) lime, (c) water, (d) an epoxy resin, and (e) a polyfunctional cross-linking agent forming chemical bridges between the pozzolanic material and epoxy resin. The cross-linking agent preferably comprises an organic compound including amino and carbonyl functional groups (e.g. a fatty polymide). The pozzolanic material component is the major portion, i.e. greater than 50%, of the non-aqueous weight of the composition on a lime-free and filler-free basis.

It is the general object of the invention to provide an improved pozzolanic material-based composition which has superior properties to the aforementioned stabilized soils.

It is a particular object of the invention to provide a fast-setting, high strength material of the foregoing type.

It is a further object of the invention to provide a composition of the foregoing type with minimal shrinkage on setting.

It is a particular object of the present invention to provide a composition of the foregoing type with adhesive characteristics sufficient to repair by bonding to an asphalt or coal tar road pavement which includes the mud and dirt of normal usage without the necessity of extensive conditioning.

It is a further object of the invention to provide a material with adhesion such as to form coatings on wood products, such as paper, paperboard, plywood, chipboards, bagasse and other fibrous materials, as well as give useful adhesion to various plastics and metals.

It is another object of the invention to use the present composition in conjunction with fillers (e.g. sand) for improved wear resistance to reduce the overall cost while maintaining high structural strength as for using in paving a road, improved fireproofing, acoustical or other properties.

It is another object of the present invention to provide a material of the foregoing type of low density which may be combined with lightweight fillers for use as an insulating material.

It is a particular object of the invention to provide a material of the foregoing type which can be cast into a thin adhesive film with a high degree of flexibility and strength in comparison to plaster and the like.

It is a further object to provide this material in a form which can be workable and applied in a variety of conventional techniques such as used in the concrete or plastering industry.

Other and further objects of the present invention will be more apparent from the following description.

DETAILED DESCRIPTION OF THE PREFERRED EMBODIMENTS

In general, the coating and structural composition of the present invention is an intimate mixture of a pozzolanic material-based material which forms a gel-like internal configuration prior to setting into a relatively porous structure, including the ingredients of pozzolanic materials, an epoxy resin, a polyfunctional cross-linking agent forming chemical bridges between the pozzolanic material and epoxy resin, lime, and sufficient water for workability of the composition. The cross-linking agent preferably comprises an organic compound including amino and carbonyl functional groups. By referring to the present composition as being "pozzolanic material-based," it is meant that the component comprises the major portion, i.e. greater than about 50 percent, of the non-aqueous weight of the composition on a lime-free and filler-free basis. As will be set forth in more detail hereinafter, a fluidizing or coupling agent may be added to the above composition during the mixing stage for improved characteristics. Also, a wide variety of fillers of either the inert or reactive type may be mixed into the composition depending upon the desired end use of the product.

A variety of natural and synthetic pozzolanic materials is suitable for use in the present invention. As used herein, "pozzolanic material" means a siliceous aluminous material which possesses pozzolanic activity, defined as the ability of the materials in finely divided form to react with calcium or magnesium lime in the presence of water to form compounds having cementitious properties. Natural pozzolan materials are widely dispersed in the central and western parts of the United States. As used hereinafter, the term "pozzolan" includes silica or siliceous aluminous materials such as the volcanic glasses, opal, clay minerals, zeolite, and hydrated aluminum oxides. The most commonly used natural pozzolans in the United States are the volcanic glasses, opal or opaline rocks, and calcined shale. Suitable clays include pozzolan clays, kaolin clays, montmorillonite clays and illite clays. One particular example of a suitable pozzolanic material which may be employed is Monterey shale. A typical sample analysis is as set forth in Table I below:

TABLE I

| | [Percent by weight] | |
|---|---|---|
| | General | Specific |
| $SiO_2$ | 70–80 | 74.27 |
| $Al_2O_3$ | 8–12 | 10.08 |
| $Fe_2O_3$ | 2–4 | 3.14 |
| $CaO$ | 2–4 | 2.93 |

TABLE I-continued

|  | [Percent by weight] | |
| --- | --- | --- |
|  | General | Specific |
| MgO | 0.5–2 | 0.86 |
| K$_2$O | 0.5–2 | 1.16 |
| Na$_2$O | 0.5–2 | 0.95 |
| H$_2$O | Balance | Balance |

One characteristic of a pozzolan clay which renders it particularly well suited for the present invention is its relatively low water absorptivity. That is, a pozzolanic clay absorbs on the order of 50 parts by volume of water for each 100 parts by volume of clay. This relatively low absorptivity substantially reduces the tendency towards shrinkage of the final composition during drying by loss of massive amounts of water in comparison to other clay materials.

It is generally preferable that the clay include a water absorptivity by volume no greater than one part water per one part clay. Clays of higher absorptivity may be utilized in certain specific applications, since these usually have useful chemical properties which can offset some of the physical disadvantages.

A kaolin clay has fair pozzolanic activity and so is well suited for use in accordance with the present invention. Its composition comprises namely kaolinite (approximately 39% alumina, 46% silica, less than 0.5% Fe$_2$O$_3$, plus impurities and water). It absorbs approximately 0.7 to 0.8 parts of water by volume per part clay, within the foregoing range of accepability.

Greenstripe clay, sold by the Interpace Corporation, having a somewhat different alumina content (on the order of 28 percent than either pozzolan or kaolin, may be utilized for purposes of the present invention. In general, the pozzolanic activity is a function of the crystalline structure of the clay, which in turn determines the amount of aluminum and hydroxyl ions which are available for chemical exchange. Greenstripe clay possesses sufficient alumina for use in accordance with the present invention. It has good adhesive qualities and possesses a relatively high absorptivity (130 parts of water per 100 parts of clay) and so may present shrinkage problems in structural materials. As stated above, this is not as important with respect to thin coatings.

A clay known as fuller's earth tends to have high absorption. Like Greenstripe clay, it has chemical properties which promote good adhesion. However the structural strength is lower than that of pozzolan clay. Thus, fuller's earth or Greenstrip clay can be used alone or blended with pozzolan clay for use as a pozzolanic material in adhering to smooth surfaces.

As briefly set forth above, the pozzolanic activity of the clay is a function of the crystal structure and the available aluminum and hydroxyl ions. Clay of high pozzolanic activity results in a relatively fast set in the presence of lime with relatively good short-term strength. The long-term strength of the material is more dependent upon the silica content and its interaction with the lime.

A number of synthetic pozzolanic materials which do not occur in nature may be employed so long as they possess the requisite pozzolanic activity. One important synthetic pozzolanic material is fly ash. One source of fly ash is pulverized coal with a typical chemical analysis set forth in the following table:

TABLE II

|  | Percent by weight |
| --- | --- |
| SiO$_2$ | 34 – 50 |
| Al$_2$O$_3$ | 17 – 30 |
| Fe$_2$O$_3$ | 7 – 26 |
| CaO | 1 – 10 |
| MgO | 0.5 – 1.6 |
| SO$_3$ | 0.2 – 3.6 |

The pozzolanic material component of the present composition comprises the major portion of the non-aqueous weight of the composition on a lime-free and filler-free basis. A suitable proportion of pozzolanic material on said basis is from at least 50–60 percent to 80–97 percent by weight. It is apparent that as the proportion of the pozzolanic material is increased, the overall cost of the material is correspondingly reduced. On the other hand, it is preferred to include an amount of epoxy resin, cross-linking agent and a fluidizing agent (herein the polymer components) of at least 3–8 percent and preferably at least 10–15 percent to as much as 30 percent or more. The reasons for this will be set forth more fully hereinafter.

Suitable epoxy resins utilized in accordance with the present invention include any thermosetting epoxy resin which includes more than 1 alpha-epoxy in an uncured state, the resin is thermoplastic while in a cured state it is thermosetting. Such resins are generally formed by the copolymerization of a monomer containing an epoxy group, or groups convertible to an epoxy group, with a monomer which is characterized by the presence of hydroxyl groups, such as di- or poly-hydric phenol, or a di- or poly-hydric alcohol.

An example of a monomer furnishing the epoxy group is epichlorohydrin, and examples of monomers furnishing hydroxyl groups are the mononuclear di- and tri-hydroxy phenols including resorcinal, hydroquinone, pyrocatechol, saligenol and phloroglucinol; glycerol; and the polynulcear and polyhydroxy phenols including bisphenol A, bisphenol F, trihydroxyl diphenyl and dimethyl methane 4,4' -dihydroxy biphenyl, the long-chain bisphenols.

One example of an epoxy resin well suited for the present purpose is the thermosetting resinous condensation product of epichlorohydrin and bisphenol A, the latter being the reaction product of phenol and acetone, dimethyl di-p-hydroxy-phenyl methane (CH$_3$)$_2$ C(C$_6$H$_4$OH)$_2$. Another example is the thermosetting resinous condensation product of epichlorohydrin and bisphenol F, di-p-hydroxy phenyl methane, CH$_2$(C$_6$H$_4$OH)$_2$. Still another example is the thermosetting resinous condensation product of epichlorohydrin and glycerol.

The epoxy resin in accordance with the present invention must be in a liquid state prior to curing or chemical inter-reaction. At the present time, perhaps the most widely used epoxy resin of this type is a diglycidyl ether of bisphenol A (known as DGEBA). The majority of the experimental work set forth in the examples utilizes the particular liquid DGEBA resin designated under the trade name Epoxy Type 828, sold by Shell Chemical Company. This resin has an IR No. 4–1–10 and is available from a large number of chemical manufacturers.

A broad spectrum of different epoxy resins is available which may be utilized for the present invention in place of the ones specifically set forth herein. An exemplary list is set forth in Appendix 4–2 of a book entitled, *Handbook of Epoxy Resins*, by Henry Lee and Kriss Neville (1967 ed.) incorporated at this point by reference.

Suitable proportions of the epoxy resin for use in the present invention are dependent upon the ultimate use for the present composition. For example, for specialized applications such as an acid resistant coating, the proportion of the epoxy resin may be increased to as high as 25–50 percent based on the pozzolanic material. As a practical matter, the relatively high cost of the epoxy resin would dictate that the maximum epoxy content be no greater than the lower end of that range, except for specialized uses.

For reasons that will be set forth hereinafter, it is preferable that the epoxy resin be present in an amount of at least 1 percent by weight of the pozzolanic material and preferably at least 3–8 percent or more. A particularly good structural composition may include 10–20 percent or more epoxy resin.

It has been found that to impart a good set to the composition it is preferable to minimize or even eliminate the organic solvents or diluents in which many epoxy resins are carried because of their tendency to impair the setting of the present composition. Therefore, the principal solvent used in this composition is water.

Another essential component of the invention is a polyfunctional cross-linking agent which is capable of forming chemical bridges between the pozzolanic material and epoxy resin. In general, the agent comprises an organic compound which includes amino and carbonyl functional groups. The cross-linking agent serves to set the epoxy resin in the pozzolanic material matrix to form a final relatively porous composition having a gel-like internal configuration of high structural stability.

Suitable cross-linking agents include amino acids, fatty polyamides and amidopolyamines.

It is believed that compounds having only the multiplicity of carbonyl linkages can attach to the pozzolanic material, but lacking the amine linkages are unable to form permanent bonds through the epoxy. Thus it is possible to use materials such as polyvinylpyrolidone when it is desired to make hard, flexible surfaces of the type described but which will decompose in water.

A particularly effective cross-linking agent includes at least 2 carbonyl and 2 amino groups separated by at least two carbon atoms. As used herein, an amino group, which includes the carbonyl-nitrogen linkage, is included within the definition of carbonyl group.

Polyfunctional cross-linking agents for use herein include the polyamide-type condensation product of dimerized and trimerized vegetable oil, unsaturated fatty acids, and aryl or alkyl polyamines. These and other suitable sources of such fatty polyamides are set forth on page 10–6 of the aforementioned *Handbook of Epoxy Resins*, incorporated at this point by reference.

A particularly effective cross-linking agent is the polyamide condensation polymer of polymeric fat acids and polyamines such as "Versamid 125" sold by General Mills or Emerez 1512 sold by Emery Industries (Cinn., Ohio). More specifically, such materials are the fatty polyamides derived from dimerized linoleic acid and ethylene diamine or diethylene triamine. Such fatty polyamides are known for use as curing agents for epoxy resins.

When sufficient epoxy resin (e.g., 1% of the pozzolanic material) is present to control shrinkage and produce a set, the cross-linking agent (polyamide) is the most significant ingredient in controlling total strength, adhesion to substrates and acid resistance. The polyamide is at least 1% by weight of the pozzolanic material and preferably at least 3–8 percent or more. It has been found that the ratio of polyamide to epoxy resin controls setting time. For example, a weight ratio of 60:40 is optimal (setting time on the order of 4 hours) while ratios between 20:80 and 80:20, respectively, may be used for longer setting time. The total epoxy resin and cross-linking agent is suitably about 3–50 percent or more by weight of pozzolanic material, preferably 8–40 percent and optimally 10–20 percent, the upper end being cost determined.

An optional ingredient of the present invention is a fluidizing agent. Suitable fluidizing agents include silicones, polyamine functional silanes, and lignosulfonates. An example of the silane is represented by the formula $(RO)_3X$. In this formula, X represents a functional organic group such as chlorine, mercaptan, amine or diamine, epoxy, methacrylate. These reactive organic groups are attached through a stable carbon linking to the silicon. At the silicon or inorganic end of the molecule are hydrolyzable alkoxy or acetoxy groups (RO). A particularly suitable material of this type is a polyamine functional silane sold under the designation Z-6020 or Z-6020 by Dow-Corning Corporation.

The above silicones and polyamine functional silanes also serve as coupling agents which improve strength, flexibility and smoothness of the surface finish.

It has been found that the addition of a small quantity (say 0.1 percent to 1 to 3 percent or as high as 10 percent of the combined weight of the epoxy resin and cross-linking agent) of the fluidizing agent serves to significantly improve the workability, and final strength of the overall composition. That is, the fluidizing agent significantly reduces the viscosity of the material prior to setting, or conversly, can be used to reduce the amount of water required for workability. Reduction of the water causes a reduction in internal pores which increases the density and strength of the final product. In addition, the use of a small amount of the material enhances the smoothness of the surface finish and the flexibility of the material, the latter property being particularly important, when the material is used as a coating.

The amount of fluidizing agent of the foregoing type which is added is preferably sufficient to accomplish the foregoing viscosity-reducing effect as well as enhancing the surface gloss and flexibility of the product. On the other hand, the amount should not be used in excess of that which would cause a softening effect. A suitable range for this purpose would be on the order of 1–6 percent of the combined weight of the epoxy resin and cross-linking agent.

The amount of water employed in accordance with the present invention should not be in excess of that required for sufficient workability to form an intimate dispersion of the various components of the invention. Excess water can interfere with gel formation and lead to shrinkage upon drying. For this purpose, the amount of water may vary over a wide range. For example, the water may comprise on the order of 0.2 parts to 2 or more parts by weight of pozzolanic material depending upon the type of pozzolanic material, form of clay, and the like. When hydrophilic aggregates are to be added, more water may be needed. As set forth above, the amount of water necessary for workability is significantly reduced by the presence of the foregoing fluidizing agent.

The silanes or silicones impart increased flexiblity to the composition as in epoxy resins. They are believed to couple the siliceous components into the epoxy resin. In addition, the silicones serve to delay the set, if desired, and provide increased working time. It is believed that this occurs by temporary isolation of (a) the epoxy resin and cross-linking agent, and (b) pozzolanic material and lime. After the water evaporates from the mix, these compounds are retained in the mix to increase the strength and improve the surface of the material. A particular silicone, General Electric type SF-18-350, added to this mixture in small amounts (1-10 percent) of the resins, promotes hardness of the finish and improves coupling to greasy surfaces, and water proofing.

The amount of lime utilized in the foregoing varies to a great extent depending upon the filler utilized, if any, and the type thereof. As used herein, the term "lime" refers to either calcium hydroxide or calcium oxide (hydrolyzable to the hydroxide form). It may also include the so-called dolomitic limes which contain MgO or $Mg(OH)_2$. The lime reacts with the clay to give a cross-linking or stabilizing effect to the clay. Normally this requires 3-5 percent by weight of lime compared to the clay. The lime content may be as high as 20 percent, however, in order to have a surplus which can react on the siliceous portions of the mix, especially where sand is employed as a filler.

One function of the lime is that the overall composition increases in hardness in the presence of lime. It appears that the lime is incorporated to form an intergral part of the gel-like matrix of the compositions. The amount of lime utilized depending upon the filler, may substantially increase, especially where the filler is of a silica type. In this case there is a long-term hardening due to the gradual formation of calcium silicate compounds.

It is believed that the pozzolanic reaction between the lime and pozzlanic material may be accelerated by the addition of alkali salts.

Lime serves a number of important functions in the present composition. It combines with the pozzolanic material and other components to form a gel analagous to the tobermorite gel of concrete. In amounts on the order of, say, 3 percent to 5 percent of the pozzolanic material assists in reducing shrinkage. It also promotes a glossy surface with a water content sufficient to form a film upon setting. However, excessive lime, e.g. substantially in excess of 20 percent by weight of pozzolanic material in the absence of filler can result in increased foaming, excess water requirements and decreased strength.

Another technique for minimizing shrinkage of the final composition is by the addition of a shrinkage reducing agent. One such agent is calcium sulfate as in gypsum form which is known to possess expansive properties in Portland cement.

A large number of different fillers or aggregates of reactive or non-reactive and pozzolanic or non-pozzolanic type may be utilized in the above composition depending upon the final application of the same. Suitable fillers include silica compounds, cellulosic compounds, metal oxides and combinations of the same. Specific examples of such fillers include particulate materials as sand, gravel, crushed rock, slag, volcanic ash, perlite, vermiculite, pumice, cinders, fly ash, wood pulp, wood chips, wood shavings, sawdust, reduced fibers, cork, emery, trap rock, glass beads, iron oxides, magnesium oxide, particulate asphalt and particulate coal tar.

A major advantage of utilization of fillers is to reduce the cost of the overall composition. However, there are some more specific purposes for adding specific fillers. One use relies upon the relatively low density (on the order of 1) of the base material (without filler). For example, the base composition may be mixed with a filler such as vermiculite, perlite or a cellulosic material (e.g. sawdust) in a ratio of, say 1 part of composition to 1,2 or up to 5 parts of filler by weight. Such filled materials may be used in a coated or self-supporting state for a variety of uses, such as insulation. The final product is lightweight and may have useful structural strength, even though this mostly goes down with higher dilution.

Addition of certain fillers to the above composition produces an excellent fire proofing material. Suitable fillers include magnesium compounds such as magnesite and magnesium sulfate. The filler is moistened in water and thoroughly mixed into the composition. For use as insulation, air is forced into the mix as by addition of a suitable foaming agent (e.g. ammonium oleate). This results in a porous lightweight material wherein the entrapped air assists insulation.

The addition of sand or other suitable material to the foregoing basic composition not only reduces the cost and increases the compressive strength and wear resistance, but renders it particularly well-suited for a coating for the repair of roadways and the like. A silica flour may also be used in conjunction with the sand for this purpose. When silica materials are employed, it is preferable to increase the amount of lime employed to chemically incorporate the sand in the overall composition through divalent calcium bridges. The lime assists the formation of the internal gel structure. A typical amount of lime to accomodate the sand filler might be on the order of 1 part or more of lime for each 5 parts of sand added to the mix.

A major advantage of the above mixture for use as a coating on highways is that it has a certain tendency to combine with the muds and oil found on the road. Thus, a great deal of the surface preparation normally required for more traditional patching materials, such as concrete, may be eliminated. In this regard, the ability to combine with a road such as asphalt or coal tar indicated that a comminuted or partially comminuted road may be directly covered over with the composition of the present invention.

It is known in the soil stabilization field that the reduction of entrained air in a clay-lime mix normally increases the structural strength of the final composition. It is believed that the same principle applies to the present composition. Accordingly, where economically feasible, it is desirable to reduce entrained air as by mixing under a vacuum or packing the material.

The amount of water utilized for each application is adjusted depending upon the components, particularly the water absorptivity of the clay employed. In this regard it is noted that since kaolin clay has a relatively high absorptivity in comparison to pozzolan clay, the density of the final structure is correspondingly reduced, on the order of 1.0 for pozzolan and 0.85 for kaolin, depending on the manner of mixing, the type of mixer and the amount of entrapped air. This value will vary, depending upon the density and proportion of filler added, if any. The amount of water added should be adjusted for a number of factors. For example, in spraying, water loss to evaporation should be compensated. Also, for absorbent aggregates, such as vermiculite, perlite and sand, additional water is added to the mix or the aggregate is separately moistened.

An important function of the water is to provide fluidity to the mix prior to setting. The amount of water required for this purpose may be increased by the addition of substantial amounts of fillers. In application it is also possible to reduce the water in the basic mixture and separately moisten the aggregate. This is particularly useful where the basic mix is used as a primer coat prior to the mixing of aggregates. In the absence of filler, water control can be approximately the same as the pozzolanic material ± 75 percent, preferably ± 25 percent. Substantially above this value, the dilution can cause curdling of the mix, reduces structural strength and decrease the adherent properties of the mix. Substantially below this value renders the mix difficult to work because of limited flowability. However, even almost dry mixes may be used for very dense hard material without requirements for adhesiveness, as for making bricks. At about 50% less water than pozzolanic material, a mix if formed which barely flows and can be applied to absorbent substrates without swelling.

One method for forming the foregoing pozzolanic material-based coating and structural composition includes as a first step the intimate mixing of pozzolanic material, epoxy, resin, a polyfunctional cross-linking agent capable of forming chemical bridges between the pozzolanic material and epoxy resin (e.g. Versamid), lime and water. Thereafter, the mixture is permitted to be dried. Further materials such as a silicone-containing fluidizing agent and fillers of the foregoing type may also be added to the foregoing mixture prior to drying for the purposes set forth above.

It has been found that the order of mixing may affect the settability and structural strength of the overall composition. There appears to be no setting problem if all materials are added approximately simultaneously to the mix. In this case the initial gel take place in the first few minutes and smooth, self-leveling surfaces should be in place within the first five or ten minutes. Mixes which are sprayed or trowelled can be worked for usually about an hour.

It it is desired to premix the materials and delay the setting time, such as for transporting the mix to remote sites, simultaneous addition of all ingredients would not be suitable because the initial gel forms and the setting process begins in the first few minutes. While the complete mix can be used at room temperatures for as much as an hour if the method of application involves spraying or trowelling, smooth, self-leveling, semi-gloss finishes are preferably made from mixes only a few minutes old.

Several principles can be employed to delay the setting time if one wishes to minimize on-site mixing and apply this material at remote sites. The setting rate slows as the temperature is lowered, thus the entire mix can be chilled to, say, 0° to 2°C. to delay setting for a few hours. The early gel is a function of the interconnection between (a) lime and pozzolanic material and (b) between cross-linking agent (polyamide) and epoxy resin. Thus each of the components in the pairs may be separated for increased working time until final application. On the other hand, reactions (a) between the polyamides and pozzolanic material, (b) between polyamides and lime, or (c) between epoxy resin and pozzolanic material or lime are quite slow particularly in the absence of air and so these materials may be premixed some time before application.

For mixes standing more than a day, it is also desirable to separate the lime and polyamide. This can be accomplished by making two-package mixes in which these ingredients are divided or by adding the fluidizing and coupling agent in such a way as to coat these materials and temporarily isolate them from each other. Because of this coating phenomenon, for a fast set, it is desirably to add in the fluidizing and coupling agent as the last ingredient in the mix.

One way to delay setting time is to first mix the pozzolanic material, lime, water and polyamide and thereafter to add the epoxy resin shortly (e.g. less than one hour) prior to the application.

In order to promote pozzolanic activity between the lime and pozzolanic material in the present composition these materials may be first mixed with water to begin a setting action prior to gelling believed to be similar to that which precedes the formation of a tobermorite gel in concrete. Before the gel completely sets, the remainder of the present ingredients are intimately dispersed. It is believed that the pozzolanic action of the above mix leads to increased strength upon aging of the present product.

It has been found that the mix may be subdivided into two distinct batches for separate mixing. For this purpose, the cross-linking agent (e.g. Versamid) may be intimately mixed with a major portion of the pozzolanic material, say at least 40% of the amount used, prior to addition of the epoxy resin. This leads to final compositions of good settability and final structural strength.

In another mixing procedure, for the present composition, in step one, water in minimum quantity is added to the lime to produce a "quick lime" in stiff putty form.

In step two, the lime mix of step one is thoroughly mixed with the pozzolanic material as in a mortar mixer for sufficient time, say, ten minutes, to begin a gel formation analagous to that of the tobermorite gel in concrete.

In step three, the cross-linking agent (e.g. polyamide) is emulsified in water and thoroughly mixed for, say, ten minutes. In step four, the epoxy resin is mixed with the cross-linking agent. In step, five, the optional fluidizing agent is mixed into the epoxy resin or cross-linking agent, the mix is heated for fluidity and thoroughly mixed in a high speed mixer for a sufficient time, e.g. fifteen minutes, to form an intimate dispersion.

A typical composition on a filler-free basis of a pozzolan material composition based on 100 parts (weight) of water is set forth in the following table:

TABLE III

| Material | Parts by Weight | |
|---|---|---|
| Pozzolanic material | 135 | 100–150 |
| Epoxy Resin | 16 | 3–20 |
| Cross-linking agent (Versamid) | 16 | 3–30 |
| Fluidizing/coupling agent (Silane) | ½ | 0–4 |
| Lime | 5 | 2–30 |

(This mix is particularly useful for coating plywood, cardboard, bricks.)

It has been found that the pozzolanic material-based composition of the present invention shrinks substantially less than a conventional pozzolanic material even though a significant portion of water is employed to obtain a flowable mix. A further desirable characteristic of the present product is its relatively low density and open structure. It is apparent that a gel-like matrix is formed of structural integrity which has minimal shrinkage upon the loss of water during setting and subsequent drying. The gel serves (a) to bind the water during initial set of the composition, (b) as a fluid medium in which uniform interlinkage of components occurs, and (c) to prevent excessive soaking into an absorptive substrate (e.g. paper).

The resulting structure is an interlocking one which depends on the ability of pozzolanic materials to interact with lime and polyamides, and of polyamides to interact with lime and epoxy resin. The density of the resultant product can be varied from less than 1 to more than 3, depending upon the amount of water in the initial mix, the method of mixing and the type of pozzolanic material. Lime and coupling agents such as the aforementioned silanes are particularly useful in coupling aggregates into the system.

As the polyamide is increased the resulting structure becomes more flexible, the tensile strength increases, and the adhesive quality of the mix to stick to various surfaces increases.

As will be seen from the examples hereinafter, a number of experiments were performed with varying components of the present composition. The compressive strengths of suitable materials within the foregoing ranges varied to as high as 2000 p.s.i. or more.

Both the epoxy resin and polyfunctional, cross-linking agents are essential ingredients in the present composition. Where the quantity of the epoxy resin is insufficient, a crust may form on the surface of the final composition while the interior of the mix may remain "rubbery" for several days. The polyamide alone tends to cause excessive shrinkage believed to be caused by a forcing of the water from the clay.

When the quantity of polyfunctional cross-linking agent is insufficient, the remainder of the components tend to dry out in a short time (e.g. one day) to form a coating which has little adhesion and which may turn to dust upon handling. An acid resistant composition may be formed where the proportion of cross-linking agent to pozzolanic material exceeds a minimum value (on the order of 10 to 25 percent). It is believed that this occurs because of a protective coating of individual particles of pozzolanic material by the cross-linking agent.

A composition of the foregoing type may be formed and used in a number of different techniques. Many of such techniques are analagous to those used in applying paint or concrete. Because of its relative light weight, its high adhesiveness, its high strength gel and flexibility upon drying the present composition is particularly well-suited to coating on surfaces which are normally difficult to coat. For example, a relatively thick coat (e.g. 1–4 mm. or more) may be coated upon such material as plywood, cardboard, and the like. The excellent fluidity of the material enables it to be pumped, sprayed, gunned on, cast, poured, spun, floated or trowelled, depending upon the desired final composition.

Decreasing the entrapped air in the product correspondingly increases the density and strength of the final product. Adding the pozzolanic material to the water prior to lime will decrease foaming and thus decrease an entrainment in the product. Also, dissolving the cross-linkage agent in water by elevating the temperature entrains less air than dissolving by strenuous stirring. If the air is entrained by the mixing procedure, the major portion of the air bubbles can be broken by trowelling or by spraying the material. Another technique for minimizing entrained air is by application of a vacuum either during or subsequent to mixing. Also, application of the material by rolling under pressure will reduce entrainment.

Coatings of the foregoing compositions without filler are sufficiently flexible and adherent to be effectively utilized at a thickness as low as 0.1 to 5mm. on a variety of surfaces. For example, smooth, hard coatings may be applied with excellent adhesion to plywood, cardboard, asphalt, wallboard, cement and bricks. The material can also be coated onto plastics, such as polyvinyl chloride, polystyrene, and metal surfaces. In addition, when fillers or aggregates are added, this material can be used in coatings having thicknesses up to several centimeters or more.

Because the basic mix, without aggregates, has a smooth finish, the material may be utilized as a coating for a relatively rough building material such as cement blocks to form a relatively smooth, water-impermeable surface suitable as a substitution for a more expensive tiling as in a bathroom.

Other advantages of the present composition are evident when used as a coating on panels of fibrous materials such as wallboard, sold under the Trademark, "Celotex". This type of coating imparts a near-tile-like finish, waterproofs the panel, improves puncture strength, decreases flammability, all without greatly increasing the weight. The material can be applied in thicknesses substantially less than that of conventional plaster and with a lower density.

The present compositions have good structural strength and so may be employed in a self-supporting form rather than as a coating upon an independent frame. Such uses might include cast or extruded plates, shells, tubes, honeycombs, corrugations, and the like where the structure uses the material in thicknesses on the order of 1 to 30 mm.

The above composition is well suited for use in surfacing and re-surfacing roads. For example, the material can be thoroughly mixed and compacted onto a road surface. Also, an asphalt road may be re-surfaced by pulverizing the asphalt for filler as in a rotary pulverizing mixer mixing with the present composition to form an excellent road base.

Also, a slurry seal machine may be used to apply a thin (e.g. ¼ in. maximum) coating of the present composition. This material fills out the depths and hollows of asphalt that has deteriorated and cracked. Machines can lay this material at the rate of 5 miles per day or more. A silicone coating can be sprayed on the surface for water-proofing and salt protection.

In order to more clearly disclose the nature of the present invention, a number of specific examples of the practice of the same are given herein. It is to be understood, however, that this is done by way of example and is intended neither to delineate the scope of the invention nor limit that of the appended claims.

EXAMPLE 1

In sequence add the following ingredients, mixing after each addition. To 400 grams of water, add
100 grams of polyamide (General Mills Versamid 140), then add
450 grams of pozzolanic material (Airox Pozzolan), then add
50 grams of Quicklime, and finally
65 grams of epoxy resin (Shell Epoxy Type 828).

When applied within the first few minutes after mixing, the material self-glazed to a level matte to semi-gloss finish. The coating set within about 1 hour, became hard in above 24 hours, and progressively harder over 2–3 months. the initial density was approximately 1.25, the after 3 months density was approximately 0.95. Its color is dark, reddish brown, similar to arch bricks of the building trades. Testtreating by contact with muriatic acid (31% HCl solution) left no significant affect.

The above formulation forms about 800 cc. of mix which can be sprayed on or trowelled onto various surfaces, including plywood, styrofoam, old concrete or brick. It is well-suited for coating of a fibrous composition insulating wallboard (trademark board such as Celotex).

EXAMPLE 2

The mix of Example 1 is filled with an aggregate of sand. After completion of the above mixing procedure, the following ingredients are added sequentially:
100 cc. of 30-mesh sand, and
500 cc. of 60-mesh sand.

The resulting product can be trowelled on various surfaces such as cardboard, wallboard and plywood to make a hard coating used as a patching compound for filling holes in old concrete. In the latter case the only preparation normally required for the old surface is to blow away any loose foreign material such as by pressurized gas. The hardness of this material is comparable to concrete.

EXAMPLE 3

The procedure of Example 1 was performed in the indicated order with the following ingredients:
600 grams of water, mix
45 grams of polyamide (General Mills Versamid Type 140), then add
600 grams of pozzolanic material (Airox Pozzolan), then mix in
50 grams of Quicklime, then mix
70 grams of Epoxy Resin (Shell Epoxy Type 828).

A product similar in characteristics to the one of Example 1 was produced. The major distinction between procedures was that the product of Example 3 took a somewhat longer time to set.

EXAMPLE 4

The procedure of Example 1 was followed using the same ingredients except that the water component was increased to 500 grams.

In comparison to the product of Example 1, the mix tended to reject the excess water as a clear fluid over the mix which can cause the mix to curdle and somewhat reduce strength and adherence to various surfaces. The composition possessed increased flowability, desirable for specialized application techniques. The final density was somewhat lower.

EXAMPLE 5

The procedure of Example 1 was followed with the following ingredients:
450 grams of water, mix
100 grams of polyamide (General Mills Versamid Type 140), then mix
450 grams of pozzolanic material (Airox Pozzolan), then mix
50 grams of Quicklime, then mix
65 grams of Epoxy Resin (Shell Epoxy Type 828), then add about
1 liter of vermiculite and mix until all particles are coated.

The resulting product is a mix that can be trowelled on various surfaces, it is lightweight (density about 0.5 to 0.6) It is fire retardant, and will stock to metal surfaces without a prime coating.

EXAMPLE 6

The procedure of Example 1 was followed except the water content was decreased from 400 grams to 300 grams. A mix was formed which will barely flow, can be applied to a wall in 10 mm. thickness without sagging and will shed almost no water on drying. This latter feature enables the mix to be applied to absorbent substrates with relatively little danger of causing them to swell.

EXAMPLE 7

The procedure of Example 1 was followed except the water content was decreased from 400 grams to 350 grams.

This mix was a little more stiff than Example 1, but it still can be sprayed at close range or trowelled. It is well suited to coating absorbent materials such as cardboard, because there is less water available to warp the substrate.

EXAMPLE 8

In the following Example, the water content is reduced compared to Example 1, by the addition of a fluidizing agent. To
350 grams of water, add and mix
10 grams of fluidizing agent (Dow Corning Silane Type Z-6050), then mix
100 grams of polyamide (General Mills Versamid Type V-140), then mix
450 grams of pozzolanic material (Airox Pozzolan), and then mix
100 grams of Quicklime, then mix
65 grams of Epoxy Resin (Shell Epoxy Type 828), then add
1000 cc. of 16-mesh sand and mix with
500 cc. of 30-mesh sand.

The silane increases the apparent amount of water to an extent that the mix not only has a good flow but it also has enough water to accommodate the extra lime and the sand. It is believed that the silane promotes the coupling between the silica contents of the mix and the epoxy. The extra lime in this Example operates over a long period (months-years) on the sand acting much like Roman cement and brings the components into the total matrix.

EXAMPLE 9

The following procedure was employed: Mixing for reactive surfaces: One type of surface against which this type of coating shows useful adhesion is aged asphalt as encountered in black-top pavings and some roofing compounds. While considerable experimentation is necessary for specific applications, certain principles can be understood from the following. To:
  400 grams of water, mix
  100 grams of Versamid Type 140 and
  10 grams of Silane Type Z-6050. When gel forms, mix
  450 grams of Pozzolan and then
  50 grams of Quicklime, then
  75 grams of Epoxy Type 828. Finally add about
  2 liters of appropriate sand/gravel aggregate.

When the sand is held to so-called 16-mesh and smaller, the result is a cement-like material with good properties for surfacing tennis courts, patching asphalt driveways and the like. In the case of the latter, broken asphalt can be substituted for much of the aggregate.

EXAMPLE 10

The following procedure was followed:
  400 grams of water, mix in
  100 grams of polyamide (General Mills Versamid Type 140), then mix
  450 grams of Pozzolan, and
  50 grams of Quicklime, then
  10 grams of coupling agent (General Electric Silicone Type SF-18-350), then
  65 grams of Epoxy Resin (Shell Epoxy Type 828).

This coating, applies so as to eliminate any foam from the mix, and applied within a few minutes after mixing, will form a reddish-bronze colored coating that has a semi-glaze, throws a minimum of water into the substrate and gives good surface hardness.

EXAMPLE 11

The following procedure was used:
  400 grams of water, mix
  50 grams of polyamide (General Mills Versamid Type 140), then mix
  370 grams of Interpace Corporation Ione Kaolin, then mix
  70 grams of Quicklime, then mix
  4 grams of silicone (General Electric Silicone Type SF-18-350), and mix
  60 grams of Epoxy Resin (Shell Epoxy Type 828).

This mix makes about 1 liter of semi-liquid which can be sprayed, poured, pumped, trowelled, and dries to a hard, off-white, near-gloss surface.

In bulk, the density of the material is in the range of 0.85. This material can be colored, using techniques and materials which are generally used in the plastics industry.

The kaolin produced a white product in contrast to the pozzolan clay which has a reddish brown color characteristic of its iron content.

EXAMPLE 12

In the above examples, all materials will be mixed in quick succession and applied within minutes of the mixing. This example illustrates subdivision of the ingredients suitable for application at remote sites. Any of the mixes mentioned above can be made to last if they are divided into components. Water can be entirely or partly in with the polyamide, silane, and pozzolanic material for several days if these components are separated from the epoxy and lime. Thus, one way of carrying the mixture to a jobsite is to take it in two containers, illustrated by the following ratios:

Container 1 is a mixture of
  400 grams of water
  100 grams of Versamid Type 140
  4 grams Silane Type Z-6050
  450 grams Pozzolan
Container 2 is a mixture of
  67 grams of Epoxy Type 828
  50 grams Hydrated Lime

EXAMPLE 13

Ingredients:
  20 oz. of pozzolan clay
  5 oz. of hydrated lime
  1 oz. of epoxy resin (Shell Epoxy Type 828)
  ½ oz. of polyamide (General Mills Versamid 140)
  ½ oz. of silicone (Dow-Corning Z-6020)

Water (one ounce) was added to an emulsion of epoxy resin and polyamide. Then the silicone was added and dispersed. This mix was then mixed with the pozzolan and lime followed by the addition and mixture of water (6 ounces).

The resulting mix is flowable and had a fast setting time.

EXAMPLE 14

100 cc. of epoxy resin (Shell Epoxy Type 828)
  40 cc. of polyamide (General Mills Versamid 125)
  2 cc. of silicone (SF-18-350 - General Electric)
  500 cc. of pozzolan clay
  100 cc. of lime hydrate
  225 cc. of water The polyamide was heated and mixed with silicone, epoxy resin and 75 cc. of water. Thereafter, the pozzolan, lime and remainder of the water were mixed. The initial somewhat tacky set occurred in 2.5 hours and a final untacky set occurred in 5.5 hours.

EXAMPLE 15

800 cc. of epoxy resin
  375 cc. of polyamide (General Mills Versamid 125)
  800 cc. of clay soaked in epoxy resin
  30 cc. of silicone (Dow-Corning Z-6020)
  1600 cc. of pozzolan clay
  500 cc. of hydrate lime Steps
1. The lime and pozzolan were thoroughly mixed with 500 cc. of water for 15 minutes.
2. The silicone was added to 250 cc. of water and immediately mixed with the polyamide.
3. Then the clay soaked in epoxy resin was mixed for 20 minutes to remove lumps.
4. The mixes of steps (3) and (4) were then mixed for 10 minutes.
5. The mix of step (4) was mixed with the lime and pozzolan clay for 15 minutes.

The sample is applied to paper, cardboard and filled in to containers.

EXAMPLE 16

One part of the mix of Example 15 was mixed with three parts of 30-mesh sand with the addition of water to make it plastic.

The sample was applied to cardboard and started to take a final set in about 5.5 hours.

We claim:

1. In a method for forming a pozzolanic material-based coating and structural composition from 100-150 parts by weight of pozzolanic material, 3–20 parts by weight of liquid epoxy resin, 3–30 parts by weight of a polyfunctional crosslinking agent capable of forming chemical bridges between said pozzolanic material and epoxy resin, said agent comprising an organic compound including at least two amino and at least two carbonyl functional groups, 2–30 parts by weight of lime, and water, said pozzolanic material component comprising greater than 50% of the nonaqueous weight of said composition on a lime-free and filler-free basis, comprising the steps of (a) intimately mixing the polyfunctional cross-linking agent with a major portion of the pozzolanic material in an aqueous dispersion, and lime, (b) mixing the epoxy resin with the aqueous dispersion of step (a), and (c) permitting said mixture to set.

2. A method as in claim 1 in which said cross-linking agent is an organic compound including amino and carbonyl functional groups.

3. A method as in claim 1 in which a fluidizing agent is added in step (a).

4. A method as in claim 1 in which in step (a) a particulate filler is also intimately mixed into the composition, said filler being selected from the group consisting of silica compounds, cellulosic compounds, metal oxides, and combinations thereof.

5. A method as in claim 1 in which said cross-linking agent is a fatty polyamide.

6. A method as in claim 1 in which a fluidizing agent is added to said mixture prior to setting, said fluidizing agent being selected from the group consisting of a polyamine functional silane, silicone and silicon rubber and comprising at least 0.1% by weight of said epoxy resin and cross-linking agent.

7. A product formed by the process of claim 1.

8. In a method for forming a pozzolanic material-based coating and structural composition from 100-150 parts by weight of pozzolanic material, 3–20 parts by weight of liquid epoxy resin, 3–30 parts by weight of a polyfunctional cross-linking agent capable of forming chemical bridges between said pozzolanic material and epoxy resin, said agent comprising an organic compound including at least two amino and carbonyl functional groups, 2–30 parts by weight of lime, and water, said pozzolanic material component comprising greater than 50 percent of the nonaqueous weight of said composition on a lime-free and filler-free basis; comprising the steps of (a) sequentially mixing in aqueous dispersion the polyfunctional cross-linking agent, lime and a major portion of the pozzolanic material, (b) mixing the epoxy resin with the aqueous dispersion of step (a), and (c) permitting said mixture to set.

* * * * *